United States Patent [19]

Kuzuhara et al.

[11] Patent Number: 4,928,431
[45] Date of Patent: May 29, 1990

[54] DOOR WEATHER STRIP FOR MOTOR VEHICLE

[75] Inventors: Michio Kuzuhara, Kakegawa; Jun Shibasaki, Ichinomiya, both of Japan; Andree St. Louis, Waterville, Canada; Christian St. Laurent, Waterville, Canada; Michel Bedard, Waterville, Canada

[73] Assignees: Toyoda Gosei Co., Ltd., Nishikasugai, Japan; Waterville TG, Inc., Waterville, Canada

[21] Appl. No.: 354,297

[22] Filed: May 19, 1989

[30] Foreign Application Priority Data

May 25, 1988 [JP] Japan ................. 63-128080

[51] Int. Cl.⁵ .............................................. E06B 7/16
[52] U.S. Cl. .................................... 49/479; 49/498
[58] Field of Search ............... 49/479, 498, 497, 485

[56] References Cited

U.S. PATENT DOCUMENTS

| 2,794,221 | 6/1957 | Bedics | 49/479 |
| 2,974,079 | 3/1961 | Korotkevich | 49/479 X |
| 3,037,251 | 6/1962 | Landis | 49/479 X |
| 3,553,301 | 1/1971 | Reardon et al. | |
| 3,958,369 | 5/1976 | Mathellier | 49/479 |
| 4,769,947 | 9/1988 | Ogawa et al. | 49/479 |

FOREIGN PATENT DOCUMENTS 58-205749 11/1983 Japan .

Primary Examiner—Philip C. Kannan
Attorney, Agent, or Firm—Cushman, Darby & Cushman

[57] ABSTRACT

A weather strip for providing a seal between a door opening of a body of a motor vehicle and a door frame, has extruded members and a molded member for connecting ends of the extruded members. Each of the extruded members and the molded member is provided with a base portion, and a tubular sealing portion projecting from the base portion to be pressed by the body of the motor vehicle and the door frame when a door is closed. The tubular sealing portion has a flat board like bridge connecting opposing inner side surfaces of the sealing portion. The bridge extends so as to cross a connection boundary between each of the extruded members, and the molded member in a direction perpendicular to the connection boundary. When the sealing portion is pressed by the body and the door frame, the connection boundary is backed up by the bridge so that an abrupt change in deformed state on both sides of the connection boundary can be reduced or moderated. Accordingly the deformation of the sealing portion becomes uniform throughout the whole length thereof, and continuous sealing performance can be obtained.

6 Claims, 3 Drawing Sheets

4,928,431

DOOR WEATHER STRIP FOR MOTOR VEHICLE

BACKGROUND OF THE INVENTION

1. Field of the Invention

The present invention relates to a weather strip to be used in a motor vehicle, and more particularly to a door weather strip for providing a seal between a door opening of a body of the motor vehicle and a door frame.

2. Description of the Prior Art

The door weather strip is generally formed of rubber elastic material such as sponge rubber, and is provided with a base portion 31 and a tubular sealing portion 32 as shown in FIG. 5. The above-described door weather strip 3 is obtained by connecting straight extruded members 3A, 3A by molding thereby forming a corner member 3B. The thus obtained door weather strip 3 is attached along a door opening of a vehicle body 1 or an outer periphery of a door frame 2 in the base portion 31. When a door(not shown) is closed, the attached door weather strip is pressed by the vehicle body 1 and the door frame 2 in opposing side surfaces of the sealing portion 32 thereby providing a seal therebetween.

In connection boundaries 4 between the extruded members 3A, 3A and the molded corner member 3B is inevitably generated difference in level of surface. And also due to the difference in vulcanizing condition or the like between the extruded members 3A, 3A and the molded corner member 3B, the resultant properties such as flexibility when pressed differ therebetween. This results in seal discontinuation being liable to be generated in the respective connection boundaries 4.

This seal discontinuation can be observed by applying an aqueous solution of minimum to one of side surfaces of the sealing portion 32 of the door weather strip attached along the door frame 2 or the door opening of the vehicle body 1, and immediately closing the door to transfer the above aqueous solution to the door frame 2 or the door opening.

As a result of the above-described seal test made by our inventors, interrupted portions 70 indicating the seal discontinuation in the above-described connection boundaries are sometimes observed in obtained transfers 7.

SUMMARY OF THE INVENTION

It is an object of the present invention to provide a door weather strip exhibiting a good sealing performance in connection boundaries between extruded members and a molded member similarly to that in the other portions without seal discontinuation.

The present invention is characterized in that in a door weather strip having a tubular sealing portion and composed of straight extruded members and a molded member molded in conformity to corners of a door frame or a door opening, a bridge is formed within the tubular sealing portion so as to connect opposing inner side surfaces thereof from the extruded member side to the molded corner member side crossing a connection boundary therebetween in a direction perpendicualr to the connection boundary.

According to the present invention, when the sealing portion of the door weather strip is pressed by the door frame and a vehicle body defining the door opening, the connection boundary is backed up by the bridge so that an abrupt change in deformed state on both sides of the connection boundary can be reduced or moderated by virtue of a reaction force exerted by the bridge. This results in the deformation of the sealing portion of the door weather strip becoming uniform from each extruded member to the molded member, and accordingly continuous sealing performance being obtained.

BRIEF EXPLANATION OF THE DRAWING

FIG. 2 is a perspective view of a corner portion of the door weather strip;

FIG. 3 is a cross sectional view taken along the line III—III of FIG. 2;

FIG. 4 is a view showing the result of a seal test;

DETAILED DESCRIPTION OF THE EMBODIMENTS

Figure 1:
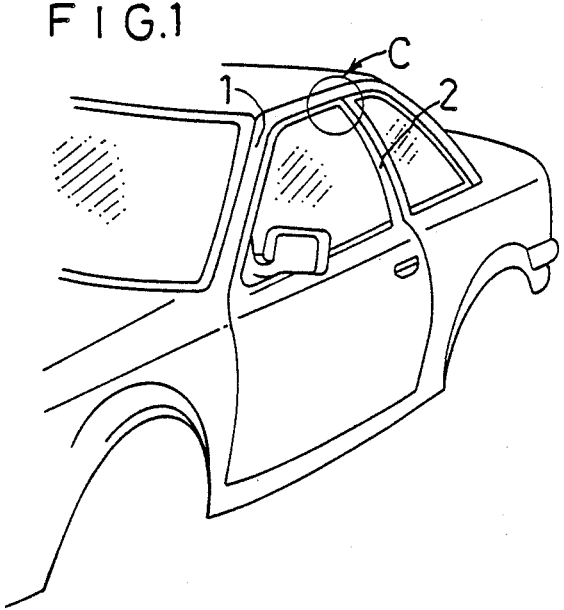
FIG. 1 is a perspective view of a side of a motor vehicle.
Figure 2:
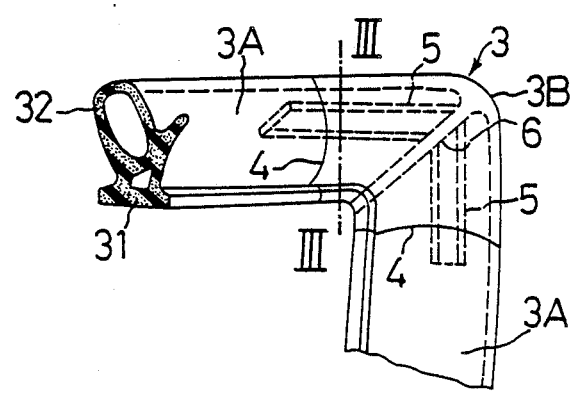
FIGS. 2 to 4 illustrate an embodiment of a door weather strip according to the present invention.

FIG. 2 illustrates a corner portion (portion C in FIG. 1) of a door weather strip 3 to be attached along a door frame 2.

The door weather strip 3 is formed of EPDM sponge rubber, and is composed of straight extruded members 3A, 3A and a molded corner member 3B. The door weather strip 3 is provided with a base portion 31 and a tubular sealing portion 32. Each extruded member 3A has a cross sectional shape common to that of the molded corner member 3B.

Figure 3:
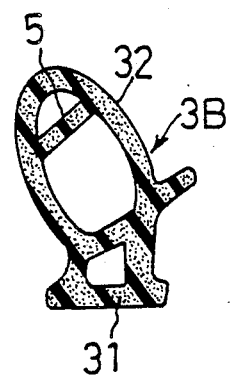

As shown in FIGS. 2 and 3, within the door weather strip 3 are formed flat board like bridges 5, each of which connects opposing inner side surfaces of the sealing portion 32 from the extruded member 3A to the molded corner member 3B through a connection boundary therebetween. Each bridge 5 extends in a direction substantially equal to the operating direction of a pressing force of the vehicle body 1 and the door frame 2 to both side surfaces of the sealing portion 32. The thickness of the bridge 5 is made substantially equal to or slightly less than the wall thickness of the sealing portion 32.

Hereinafter, the producing method of the above-described door weather strip 3 will be explained.

The extruded members 3A, 3A are set within a mold(not shown) so that ends of the extruded members 3A, 3A are disposed at right angles to each other through a cavity adapted to form the molded corner member 3B. At this time, mandrels(not shown) are previously inserted from openings of end portions of tubular sealing portions of the respective extruded members 3A, 3A, in respective one ends thereof, and set within the mold so that the other end of the respective mandrels are opposed in spaced relationship. Each of the mandrels is provided with a slot(not shown) adapted to form the bridge 5.

Then, the mold is closed and rubber material equal to the material of the extruded members 3A, 3A is poured into the cavity. This results in the rubber material filling the slots of the mandrels as well as the spaces around and between the mandrels. Thus, the molder corner member 3B provided with a partition wall 6 formed in the space between the mandrels, and the bridges 5 formed in the slots of the mandrels is formed. The mandrels are removed from the molded corner member 3B after the mold is opened.

Figure 4:
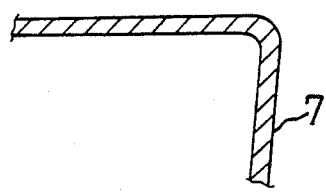
Figure 5:
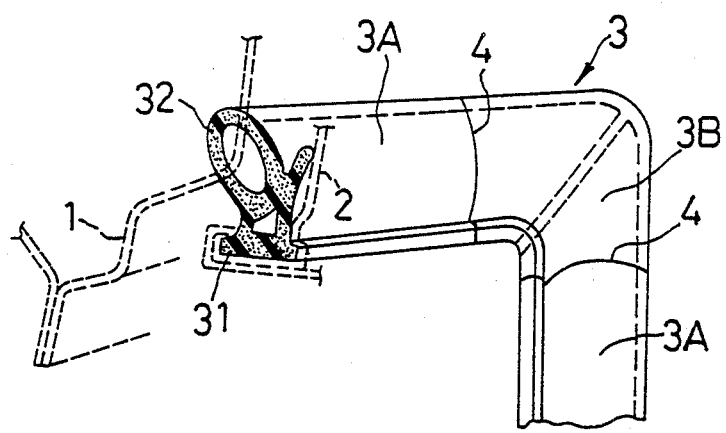
FIG. 5 is a perspective view showing the attaching state of a conventional door weather strip to a corner portion of a vehicle body.
Figure 6:
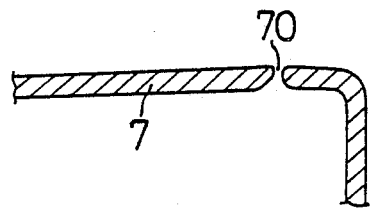
FIG. 6 is a view showing the result of a seal test of the conventional door weather strip.

FIG. 4 shows the result of the seal test of the door weather strip provided with bridges 5 according to the present invention. The test result shows that no discontinuation appears on the obtained transfer 7, and accordingly that the sealing portion of the door weather strip 3 is in uniform pressure contact with both the vehicle body 1 and the door frame 2 without seal discontinuation.

In the molded corner member 3B, the partition wall 6 need not be necessarily provided. This partition wall 6 is not formed in case of the ends of the mandrels being set in closely contacting state, or in the case of a single mandrel being used in place of separated two mandrels.

In the above embodiment, the bridges 5 are formed on both the horizontal side and the vertical side of the molded corner member 3B. Instead, the bridge 5 may be formed either the horizontal side or the vertical side thereof.

What is claimed is:

1. A weather strip for providing a seal between a door opening of a body of a motor vehicle and a door frame, comprising:
   extruded members; and
   a molded member for connecting ends of said extruded members;
   each of said extruded members and said molded member being provided with a base portion to be attached along the door opening or the door frame, and a tubular sealing portion projecting from said base portion to be pressed by the body of the motor vehicle or the door frame when a door is closed;
   said tubular sealing portion being provided with a bridge connecting opposing inner side surfaces of said sealing portion, said bridge extending so as to cross a connection boundary between each of said extruded members and said molded member in a direction perpendicular to said connection boundary.

2. A weather strip according to claim 1, wherein said weather strip is composed of a rubber elastic body, and said bridge is integrally formed with said molded member.

3. A weather strip according to claim 2, wherein said bridge has a flat board like shape, and extends in a direction substantially equal to the pressing direction of the body of the motor vehicle and the door frame to said tubular sealing portion.

4. A weather strip according to claim 3, wherein said bridge has a thickness substantially equal to the wall thickness of said tubular sealing portion.

5. A weather strip according to claim 2, wherein said molded member composes a corner portion of said weather strip, and said bridge is formed in the vicinity of said connection boundary between each of said extruded members and both ends of said molded member.

6. A weather strip according to claim 5, wherein a partition wall is formed in the middle of said molded member for longitudinally partitioning an inner space of said tubular sealing portion, a first bridge is formed on one side of said partition wall from said partition wall to one connection boundary between one of said extruded members and one end of said molded member while a second bridge is formed on the other side of said partition wall from said partition wall to another connection boundary between another one of said extruded members and the other end of said molded member.

* * * * *